United States Patent

Hanzawa

[11] Patent Number: 5,851,941
[45] Date of Patent: Dec. 22, 1998

[54] SI/SIC-BASED SINTERED MATERIAL HAVING EXCELLENT CORROSION RESISTANCE AND KILN FURNITURE

[75] Inventor: Shigeru Hanzawa, Kagamihara, Japan

[73] Assignee: NGK Insulators, Ltd., Japan

[21] Appl. No.: 803,442

[22] Filed: Feb. 20, 1997

[30] Foreign Application Priority Data

Mar. 1, 1996 [JP] Japan ........................ 8-44729

[51] Int. Cl.$^6$ ............ C04B 35/565; C04B 35/577; C04B 35/64; F27D 1/00
[52] U.S. Cl. ............ 501/88; 34/266; 432/120; 432/121; 428/446; 501/94; 501/154; D15/144.1
[58] Field of Search .............. 428/446; 432/120, 432/121; D15/144.1; 501/88, 94, 154; 34/266

[56] References Cited

U.S. PATENT DOCUMENTS

| | | | |
|---|---|---|---|
| 4,710,428 | 12/1987 | Tamamizu et al. | 428/408 |
| 4,789,506 | 12/1988 | Kasprzyk | 264/25 |
| 4,795,673 | 1/1989 | Frechette et al. | 428/331 |
| 4,859,385 | 8/1989 | Tanaka et al. | 264/62 |
| 5,338,576 | 8/1994 | Hanzawa et al. | 427/430.1 |
| 5,417,803 | 5/1995 | Goldstein et al. | 156/662.1 |
| 5,494,439 | 2/1996 | Goldstein et al. | 432/253 |
| 5,542,194 | 8/1996 | Hanzawa et al. | 34/266 |

FOREIGN PATENT DOCUMENTS

| | | |
|---|---|---|
| 0 677 496 A2 | 10/1995 | European Pat. Off. . |
| WO 82/01545 | 5/1982 | WIPO . |

OTHER PUBLICATIONS

Derwent Publication of Japanese Abstract JP 63–144180 A, Jun. 1988.

*Primary Examiner*—Rabon Sergent
*Attorney, Agent, or Firm*—Parkhurst & Wendel

[57] ABSTRACT

A Si/SiC-based sintered material containing Si and SiC as constituents, which has a $SiO_2$ content of 0.5% by weight or less and an oxygen content of 0.25% by weight or less and which is corrosion-resistant in a high-temperature atmosphere containing an element having a high ionic-bond formability. A kiln furniture made of the sintered material. The sintered material and the kiln furniture have high corrosion resistance in a high-temperature environment containing, as a corrosion source, an element having a high ionic-bond formability and can withstand long-term use.

5 Claims, 4 Drawing Sheets

5,851,941

SI/SIC-BASED SINTERED MATERIAL HAVING EXCELLENT CORROSION RESISTANCE AND KILN FURNITURE

BACKGROUND OF THE INVENTION

1. Field of the Invention

The present invention relates to a Si/SiC-based sintered material having excellent corrosion resistance; a kiln furniture and a kiln lining material each made of the sintered material; and a kiln using the furniture and the lining material.

2. Description of Related Art

SiC-based sintered materials play an important role in industry for their excellence in heat resistance and refractoriness. For example, SiC-based sintered materials of clay bond or silicon nitride bond are widely used as a slab material or a refractory slab in firing of ceramic whiteware (e.g. insulator, sanitary ware, tableware, picture frame and stoneware pipe), tile, etc.

SiC-based sintered materials include Si/SiC-based sintered materials containing SiC and Si as constituents. These Si/SiC-based sintered materials have been used mainly for special applications such as core tube of kiln for firing of semiconductor, roller heat exchanger tube for roller hearth kiln, and the like.

Conventional Si/SiC-based sintered materials, however, had the following problems when used as a lining material for kiln. That is, the conventional Si/SiC-based sintered material used as a kiln lining material is oxidized when heated in the presence of oxygen, resulting in reduced strength; moreover, when there is present other corrosion source(s) [e.g. lead, bismuth, antimony, chlorine and fluorine], the other corrosion source(s) may react with the kiln lining material depending upon the kind(s) of the corrosion source(s), which accelerates the corrosion of the kiln lining material; thus, the intended function of the lining material is not exhibited, resulting in reduced kiln life.

For the above reasons, there are desired a kiln furniture and a kiln lining material both of high reliability, which can withstand very severe atmospheric environments employed for production of various materials or products used in various applications.

OBJECT/SUMMARY OF THE INVENTION

The present invention has been completed in view of the above-mentioned problems of the related art, with an aim of providing a Si/SiC-based sintered material which is corrosion-resistant particularly in a high-temperature environment containing a corrosion source, a kiln furniture and a kiln lining material both made of the Si/SiC-based sintered material, and a kiln using the furniture and the lining material.

According to the present invention, there is provided a Si/SiC-based sintered material containing Si and SiC as constituents, having a $SiO_2$ content of 0.5% by weight or less and an oxygen content of 0.25% by weight or less, and the Si/Sic-based sintered material being corrosion-resistant in a high-temperature atmosphere containing an element having a high ionic-bond formability. There are also provided a kiln furniture and a kiln lining material both made of the above Si/SiC-based sintered material.

Incidentally, the element contained in the above-mentioned high-temperature atmosphere is at least one element having a high ionic-bond formability, selected from Ge, As, Se, In, Sn, Sb, Te, Tl, Pb, Bi, Cl and F and contains a metal element having a melting point of 650° C. or more and a boiling point of 1,500°–1,750° C.

According to the present invention, there is further provided a continuous kiln wherein at least the region exposed to a heating atmosphere of 800°–1,400° C. is made of the above-mentioned Si/SiC-based sintered material.

DETAILED DESCRIPTION OF THE INVENTION

Figure 1:
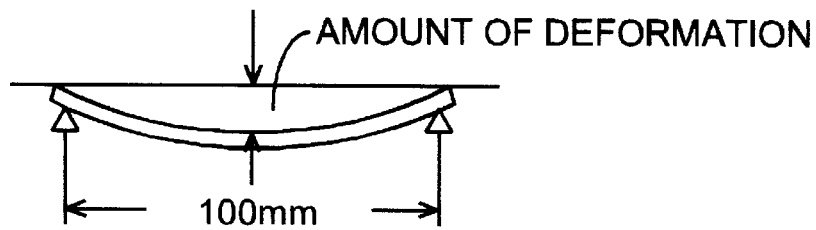
FIG. 1 is a side view showing the test method for creep resistance, used in the present invention.

In the Si/SiC-based sintered material of the present invention, the oxygen content is controlled at 0.5% by weight or less, preferably at 0.3% by weight or less, more preferably at 0.1% by weight or less. The oxygen in the sintered material is present as $SiO_2$ and oxides of very-small-amount-components such as Al, Fe, Ca and the like.

In the present Si/SiC-based sintered material, $SiO_2$ consists of (1) $SiO_2$ contained in the SiC powder and metal Si both used as starting materials of the Si/SiC-based sintered material and (2) $SiO_2$ formed by oxidation in production of the Si/SiC-based sintered material. Any of the $SiO_2$ (1) and (2) reduces the creep resistance of the sintered material. In the firing step of Si/SiC-based sintered material production, SiO gas and CO gas are formed by a reaction between $SiO_2$ and C (source), and these gases are subjected to repeated oxidation and reduction with Si, SiC and C and bring about increase in oxygen content of Si/SiC-based sintered material. Therefore, by controlling the oxygen content of the Si/SiC-based sintered material at the above level, the sintered material can have improved oxidation resistance and creep resistance.

Preferably, the high-temperature atmosphere containing an element having a high ionic-bond formability, in which the the Si/SiC-based sintered material of the present invention is used, has a temperature of 800°–1,400° C.

It is because when the temperature of the atmosphere is lower than 800° C., the reactivity of said element contained in the atmosphere is not so high and even a material other than the present sintered material is usable and, when the temperature of the atmosphere is higher than 1,400° C., the metal Si in the present sintered material is melted at about 1,410° C. and reacts with said element contained in the atmosphere.

Therefore, the present Si/SiC-based sintered material is used preferably at a temperature of 800°–1,350° C.

Next, description is made on the corrosion resistance of the present Si/SiC-based sintered material when it is exposed to an atmosphere containing at least one element selected from Ge, As, Se, In, Sn, Sb, Te, Tl, Pb, Bi, Cl, Fe, etc.

As described in detail in Examples shown later, the present inventors confirmed that in the presence of a gaseous element of high ionic-bond formability such as Cl, F or the like, ordinary ceramics containing large amounts of oxides, particularly $SiO_2$ undergo severe corrosion at the grain boundaries at high temperatures while the Si/SiC-based sintered material of the present invention having a low $SiO_2$ content and a low $O_2$ content is hardly corroded. The present inventors also confirmed that in firing a material to be fired which contains a metal element(s) of high ionic-bond formability such as Ge, As, Se, In, Sn, Sb, Te, Tl, Pb and Bi (in particular, Pb, Bi, Sb, etc. having a melting point of 650° C. or less and a boiling point of 1,750° C. or less), the fine powder of said material to be fired deposits on the slab material, lining material, etc. of kiln at the time of setting or at the start of firing and melts during firing to react with the lining material and severely corrode the lining material. It was presumed that said metal elements have a high boiling point of 1,500° or more and are not vaporized (accordingly not disposed) even at about the highest temperature (ordinarily used) of kiln firing region and thereby the corrosion becomes even higher.

Meanwhile, the kiln lining material made of the present Si/SiC-based sintered material did not react with any of said metal elements of high ionic-bond formability and was hardly corroded; Pb or Bi, in particular, only flew on the surface of the lining material. Thus, the present Si/SiC-based sintered material showed excellent corrosion resistance in the high-temperature contact with an atmosphere containing Pb, Sb or Bi. Further, the present sintered material showed little reaction, either, in the high-temperature contact with any of other metal elements of high ionic-bond formability, i.e. Ge, As, Se, In, Sn, Te and Tl.

The present Si/SiC-based sintered material showed excellent corrosion resistance also in the high-temperature contact with a Cl- or F-containing atmosphere. While PSZ melted in a F-containing atmosphere, the present Si/SiC-based sintered material showed corrosion of the Si component alone in the same atmosphere.

The kiln using a lining material, etc. made of the present Si/SiC-based sintered material can be suitably used to conduct a serial firing operation of ceramic, electronic part or the like from drying (water removal) to firing. With a kiln lining material made of a conventional S/SiC-based sintered material, the lining material is oxidized when heated in the presence of oxygen, and this oxidation is accelerated during firing depending upon the kind of other corrosion source (e.g. Pb, Bi, Sb, Cl or F) contained in a material to be fired in the kiln; as a result, the kiln lining material is corroded and the kiln is damaged.

In contrast, when the present Si/SiC-based sintered material having excellent corrosion resistance and oxidation resistance is used as a lining material for kiln, the kiln can have improved durability and the cost for repair thereof can be reduced.

That is, when a to-be-fired material containing a corrosive gas-generating or corrosive substance is fired in a kiln containing a lining material made of the present Si/SiC-based sintered material, the lining material undergoes little damage and there occurs no impairment of product in appearance, etc. owing to the oxidative deterioration of lining material and consequent deposition of lining material powder on material to be fired.

The present Si/SiC-based sintered material has a small specific gravity and a high strength and can therefore be made into a thin lining material.

Further, the present Si/SiC-based sintered material has a good thermal conductivity and can provide higher heat efficiency and lower fuel consumption. Furthermore, the sintered material, when used as a kiln lining material, can achieve uniform heating of kiln faster and can give a homogeneous fired material and accordingly a higher yield.

Thus, the kiln lining material made of the present Si/SiC-based sintered material can withstand severe environments employed in production of various materials used in various applications and is highly reliable.

Then, description is made on an example of the continuous kiln using a lining material made of the present Si/SiC-based sintered material.

Figure 2:
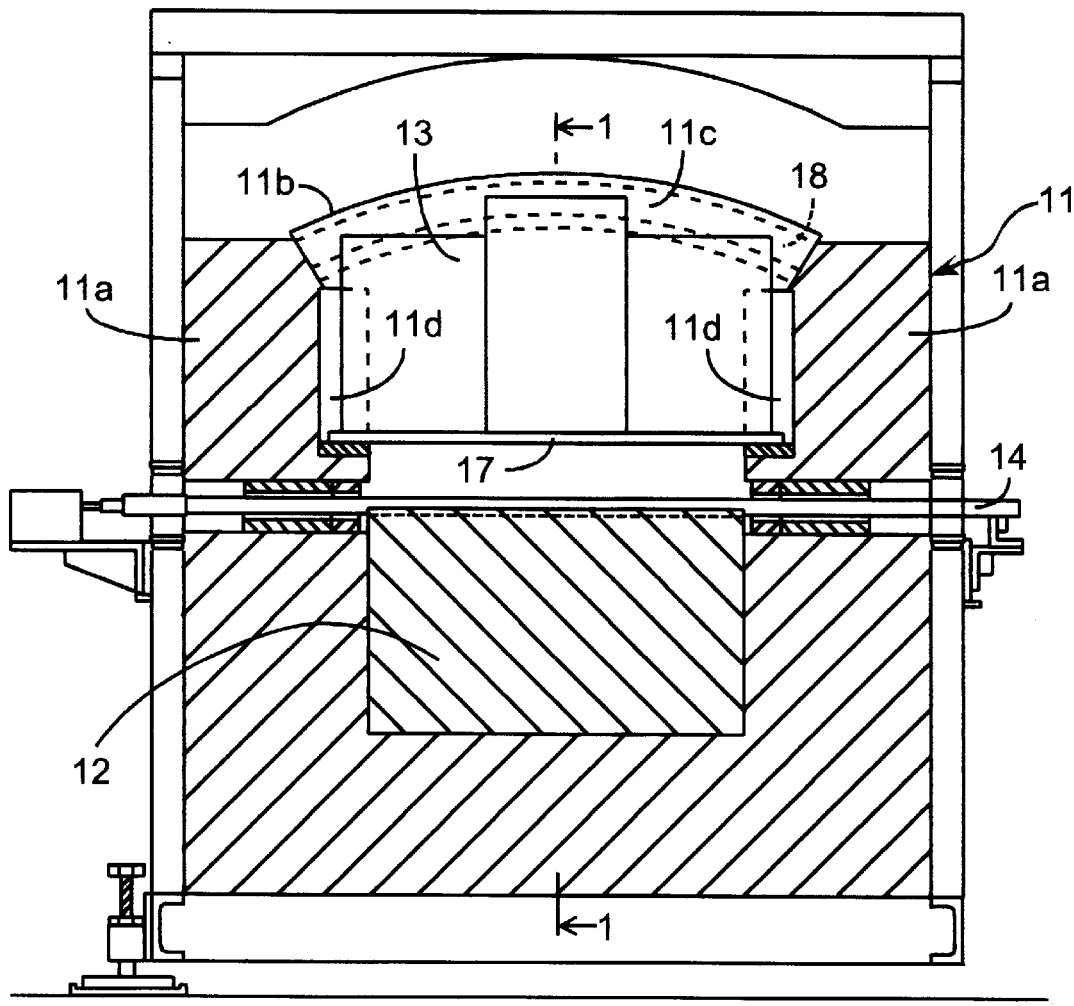
FIG. 2 is a schematic vertical sectional front view of the continuous kiln (roller hearth kiln) used in the present invention.
Figure 3:
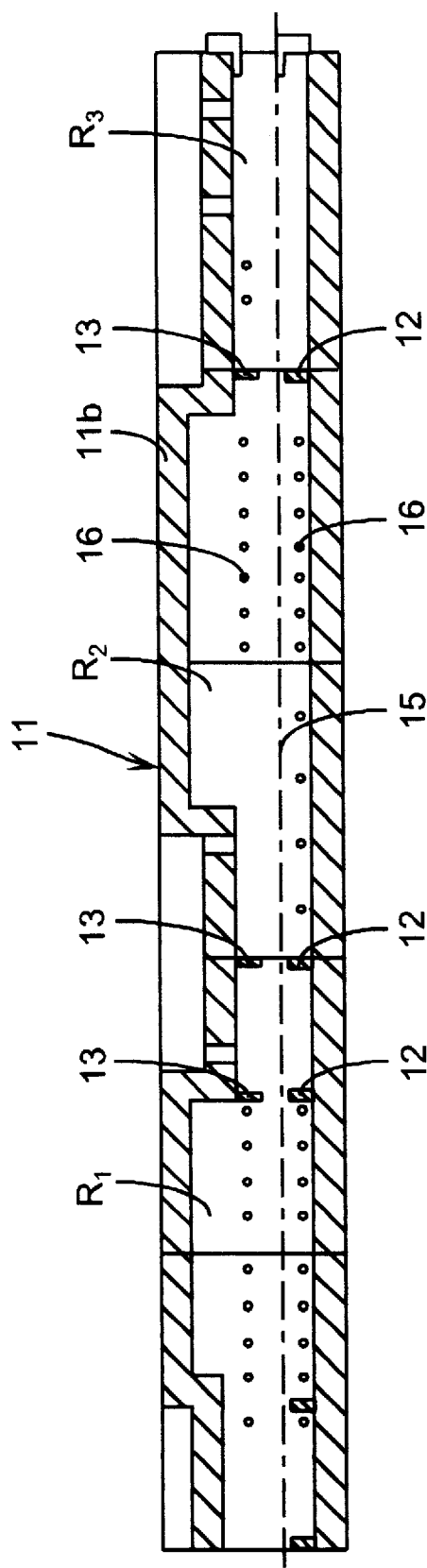
FIG. 3 is a schematic vertical sectional partial side view of the continuous kiln (roller hearth kiln) used in the present invention.
Figure 4:
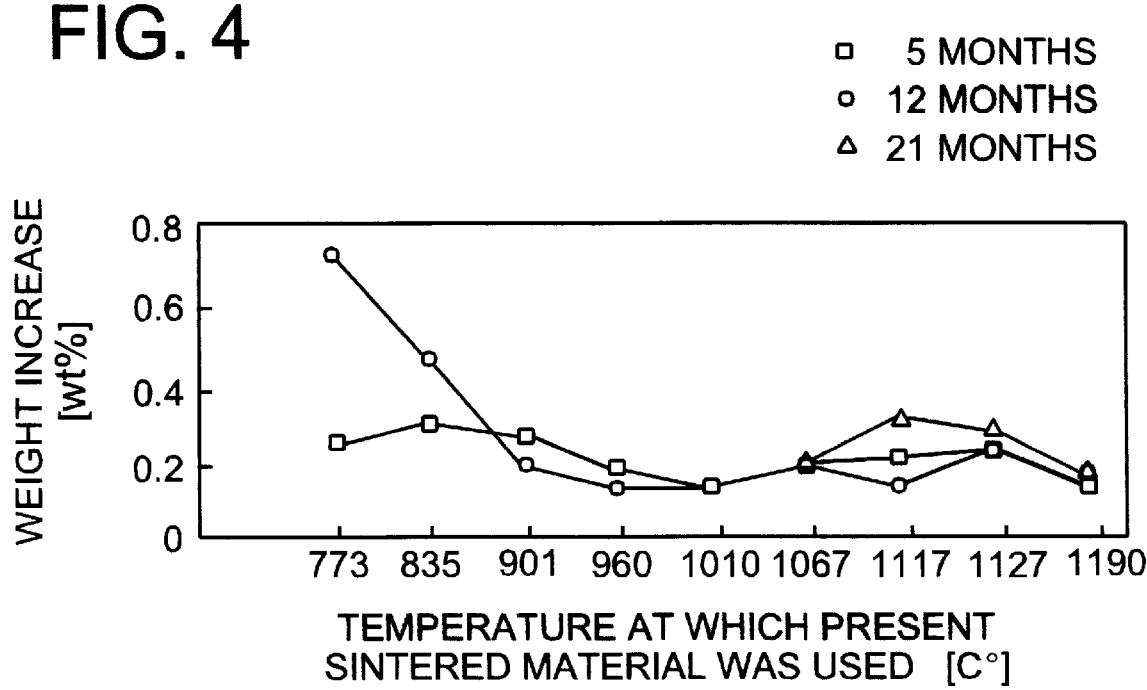
FIG. 4 is a graph showing the change of weight increase (wt. %) with temperature rise, of the Si/SiC-based sintered material of the present invention when the sintered material was used in a $CaF_2$ atmosphere in a roller hearth kiln.
Figure 5:
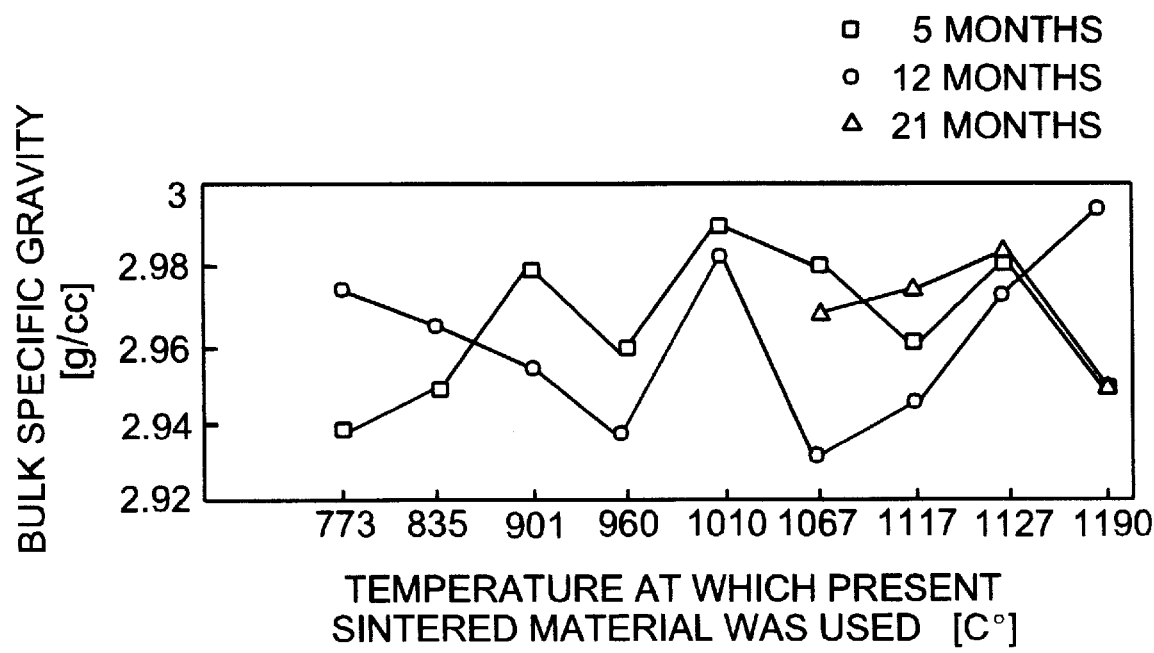
FIG. 5 is a graph showing the change of bulk specific gravity (g/cc) with temperature rise, of the Si/SiC-based sintered material of the present invention when the sintered material was used in a $CaF_2$ atmosphere in a roller hearth kiln.
Figure 6:
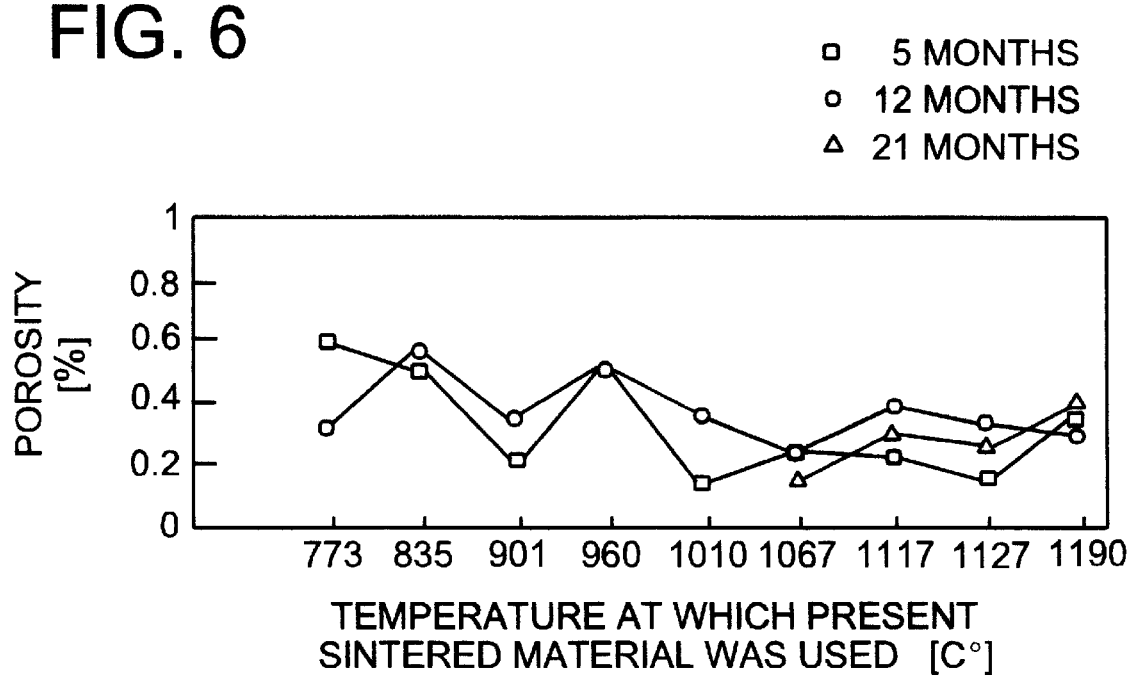
FIG. 6 is a graph showing the change of porosity (%) with temperature rise, of the Si/SiC-based sintered material of the present invention when the sintered material was used in a $CaF_2$ atmosphere in a roller hearth kiln.
Figure 7:
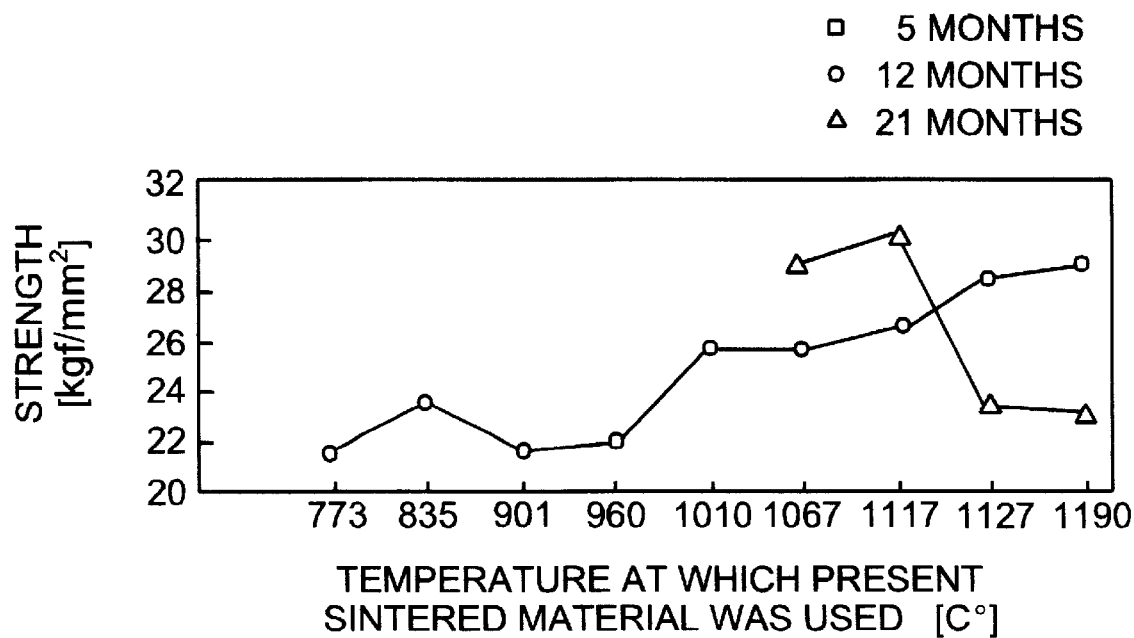
FIG. 7 is a graph showing the change of bending strength ($kgf/mm^2$) with temperature rise, of the Si/SiC-based sintered material of the present invention when the sintered material was used in a $CaF_2$ atmosphere in a roller hearth kiln.

FIG. 2 is a schematic vertical sectional front view of the continuous kiln (roller hearth kiln) used in the present invention. FIG. 3 is schematic vertical sectional partial side view of the continuous kiln (roller hearth kiln) used in the present invention.

The above continuous kiln (roller hearth kiln) comprises a kiln body 11 made of a refractory brick and having a long hollow extending in the longitudinal direction of the kiln body, a plurality of lower partition walls 12 provided at the bottom of the hollow, and a plurality of upper partition walls 13 provided at the top of the hollow.

Each lower partition wall 12 extends upward by a given length; each upper partition wall 13 extends downward by a given length; the upper end of the lower partition wall 12 and the lower end of the upper partition wall 13 face each other and form a given gap.

In the continuous kiln used in the present invention, it is preferable that the kiln-inside portions exposed to a high-temperature corrosive atmosphere, such as partition walls, lining, rollers and the like, particularly the portions heated to 800°–1,400° C. are made of the Si/SiC-based sintered material of the present invention.

In the kiln hollow, a large number of rollers 14 are provided over the longitudinal direction of the hollow. The rollers 14 are supported rotatably in a state that they penetrate into the two side walls 11a of the kiln body 11 extending in the kiln longitudinal direction, and are provided in parallel with each other so as to cross the hollow. Some selected rollers 14 are rotated by a motor (not shown).

Thereby, in the continuous kiln, there is formed a transfer path 15 for a molded ceramic material to be fired, between the upper ends of the lower partition walls 12 and the lower ends of the upper partition walls 13 facing said upper ends, and the hollow is divided into three regions, i.e. a preheating region R1 provided close to the kiln inlet, a firing region R2 and a cooling region R3 provided close to the kiln outlet.

In each region, a large number of gas burners 16 are provided above and below the transfer path 15. An optimum temperature and an optimum atmosphere are used in each region so that the material to be fired can be subjected to gradual temperature elevation in the preheating region R1 and fired at about 1,400° C. in the firing region R2 and the fired material can be subjected to gradual cooling in the cooling region R3.

In the continuous kiln, the lower partition walls 12 are made of a refractory brick similarly to the kiln body 11. In each portion of the ceiling 11b of the kiln body 11, facing the upper end of each lower partition wall 12 is formed a vertical groove 11c; and a vertical groove lid extending downward from each vertical groove 11c is formed in each of the two side walls 11a of the kiln body 11. At the bottoms of each two opposing vertical grooves lid is provided a horizontal supporting member 17.

Each supporting member 17 has a U-shaped section with the upper part being open, and crosses the hollow of the kiln body 11.

In an example, each upper partition wall 13 is a plate made of the present Si/SiC-based sintered material, is inserted from the ceiling 11b into the vertical groove 11c and the two vertical grooves 11d, and is supported at the lower end by the supporting member 17, and is buried at the upper end in the vertical groove 11c.

An example of the supporting member 17 is made of a Si/SiC-based sintered material having a high strength at high temperatures and is filled inside with a sealing member made of a ceramic fiber blanket (the upper partition wall 13 is supported by the supporting member 17 via this sealing member).

In the kiln body 11, the upper end of the vertical groove 11c formed in the ceiling 11b is filled with a sealing member 18 made of a ceramic fiber blanket, whereby each upper partition wall 13 is shielded from outside.

In the continuous kiln, the top end of each lower partition wall 12 has a triangular section with the apex directed upward. In the vicinity of each lower partition wall 12, rollers 14 are provided so that the apex of the lower partition wall 12 is interposed between the rollers 14. Therefore, even when a roller 14 is damaged, the damaged roller 14 drops onto the bottom of the kiln body 11 and the subsequent transfer of material to be fired or fired material is not interrupted.

In the continuous kiln constituted as above, since the whole portion of each upper partition wall 13 is accommodated inside the kiln body 11, there is no very large temperature difference between the different portions of the upper partition wall 13.

Therefore, each upper partition wall 13 can be free from damage caused by the large temperature difference between different portions of the partition wall 13. In the continuous kiln, since the plate made of a SiC sintered material, used as each upper partition wall 13 has a high thermal conductivity and a large strength, the plate is suitable for use as a partition wall dividing the preheating region R1 and the firing region R2.

In the above, description was made on an example of application of the present Si/SiC-based sintered material to a roller hearth kiln. Needless to say, the present sintered material is applicable also as a lining material for various continuous kilns using a different transfer means for material to be fired.

Next, description is made on the process for production of the present Si/SiC-based sintered material.

First, there is used, as molding materials, a molding mixture comprising a SiC powder, a C powder, an organic binder and water or an organic solvent. Then, the molding mixture is kneaded and molded to obtain a molded material.

The molded material is placed in an inert gas atmosphere of reduced pressure or in vacuum, in the presence of metal Si to impregnate the molded material with metal Si, whereby a Si/SiC-based sintered material is produced.

In production of the Si/SiC-based sintered material of the present invention from the above molded material, in the firing step of the molded material, the firing temperature is kept at 1,200°–1,350° C. for 0.5–24 hours in order to remove the $SiO_2$ present in the molded material, in the form of SiO gas and then at 1,420°–1,480° C. for 0.5–24 hours in order to impregnate the molded material with metal Si. By keeping the firing temperature at 1,200°–1,350° C. preferably for 1–24 hours, the $SiO_2$ and the C (source) both present in the molded material react with each other to generate SiO gas and CO gas, whereby the $SiO_2$ content in molded material (or sintered material) can be reduced. The time is more preferably 2–20 hours, particularly preferably 5–15 hours. By keeping the firing temperature at 1,420°–1,480° C. preferably for 1–24 hours, the pores formed when the SiO gas and the CO gas leave the molded material (or sintered material) are impregnated with molten Si owing to the capillarity and thereby can be reduced. The time is more preferably 2–20 hours, particularly preferably 5–15 hours.

In the sintered material, the porosity (the percent of pore volume to sintered material volume) is desirably 0.8% or less. In production of the sintered material, the amount of metal Si added must be, in view of the impregnation efficiency, more than the theoretical amount needed to achieve a porosity of 0.8%. That is, in order to achieve the porosity of 0.8%, the metal Si must be added in an amount at least 1.05 times the theoretical amount. The metal Si added is consumed in three portions, i.e. a portion contributing to a reaction of (Si+C→SiC), a portion used for filling (impregnation) of pores, and an excessive Si portion. When the metal Si is added in an amount less than 1.05 times, impregnation with Si is insufficient and the resulting sintered material has a larger porosity and has lower oxidation resistance.

Addition of excessive metal Si invites bleeding of surplus Si on the surface of sintered material. This Si on the sintered material surface, however, can be removed by sandblasting, lathing, etc.

In order to control the $SiO_2$ content in sintered material at the above-mentioned level, it is preferable to use a selected material SiC power and a selected material metal Si. That is, the C powder, the SiC powder and the metal Si are desirably selected so that the total $SiO_2$ content therein is 1.5% by weight or less, preferably 1.2% by weight or less, more preferably 0.5% by weight or less based on the total amount of the above three materials. In this connection, it is desirable that the SiC powder used has a $SiO_2$ content of 0.01–1.5% by weight, preferably 0.01–1.2% by weight, more preferably 0.01–0.5% by weight and that the metal Si used has a $SiO_2$ content of 0.01–1.5% by weight, preferably 0.01–1.2% by weight, more preferably 0.01–0.5% by weight. When the total $SiO_2$ content in materials is too high, it is difficult to reduce the oxygen content in sintered material to 0.5% by weight or less by the above-mentioned firing step alone.

In production of the sintered material of the present invention, it is also desirable that the total Fe content in the material C power, the material SiC powder and the material metal Si is 0.5% by weight or less, preferably 0.3% by weight or less, more preferably 0.2% by weight or less based on the total amount of the above three materials and that the total Ca content in the three materials is 0.5% by weight or less, preferably 0.3% by weight or less, more preferably 0.2% by weight or less based on the total amount of the three materials. The Fe and Ca contents in the materials are partially lost in the firing step; therefore, by controlling the Fe and Ca contents in the materials at the above levels, the Fe and Ca contents in sintered material can be controlled at the above-mentioned level.

In production of the present sintered material, formation of molded material can be conducted by any of press molding, cast molding and extrusion molding, but press molding is preferable in view of the mass productivity of molded material.

In press molding, the pressurization is conducted preferably by the use of an oil hydraulic press. The pressure applied by the press is ordinarily 300–2,000 kg/cm$^2$.

The present invention is hereinafter described in more detail by way of Examples. However, the present invention is not restricted to these Examples.

The sintered materials obtained in the Examples were measured for the following properties by the following test methods.

Oxygen content

A test piece of 60 mm×60 mm×5 mm (thickness) was cut out and melted by the use of a tin bath. The melt was placed in a reducing atmosphere of carbon to generate CO, and the CO was quantitatively measured. From the amount of the CO obtained was determined the oxygen content of the test piece.

Fe and Ca contents

Measured by fluorescent X-ray analysis.

Oxidation resistance

A test piece of 60 mm×60 mm×5 mm (thickness) was cut out. It was placed in a furnace of 1,150° C. and oxidized in an oxygen gas current saturated with 95° C. of hot water. The weight increase by oxidation per hour, of the test piece was measured and taken as the oxidation resistance of the test piece.

Creep resistance

A test piece of 110 mm×20 mm×5 mm (thickness) was cut out. As shown in FIG. 1, the test piece was supported at the lower side at the two points 100 mm apart from each other; a downward load of 300 kg/cm$^2$ was applied to the test piece from above at the center of the 100 mm portion in air of 1,350° C.; the amount of deformation of the test piece seen in 0–100 hours was measured and taken as the creep resistance of the test piece.

[EXAMPLE 1 AND COMPARATIVE EXAMPLE 1]

A SiC fine powder having an average particle diameter of 3 μm and a SiC coarse powder having an average particle diameter of 100 μm were mixed at a weight ratio of 30:70 to obtain a SiC powder. The SiC powder was mixed with a C powder having an average particle diameter of 1 μm, at a weight ratio shown in Table 1. 100 parts by weight of the resulting mixture was mixed with 2 parts by weight of an organic binder (methyl cellulose) and 3 parts by weight of water or an organic solvent to obtain a molding material.

In this case, the SiO$_2$ content, Fe content and Ca content in the total of the C powder, the SiC powder and metal Si (this is added later) were controlled as shown in Table 1.

Then, each molding material was disintegrated by the use of a ball mill, introduced into a mold, and molded at 500 kg/cm$^2$ by the use of an oil hydraulic press to obtain a molded plate of 400 mm×400 mm×5 mm (thickness).

Each molded plate was placed, together with metal Si, in a carbon crucible having inside an anti-reaction layer consisting of a BN coating. The metal Si was added at a ratio shown in Table 1, relative to the SiC powder and the C powder.

The molded plate and the metal Si in the carbon crucible were kept at 1,200°–1,350° C. and 1,420°–1,480° C. for the respective time lengths shown in Table 1, to conduct firing, whereby a Si/SiC-based sintered material was produced.

Incidentally, the firing was conducted in an argon atmosphere of 1 Torr.

Each Si/SiC-based sintered material was measured for oxygen content, Fe content, Ca content, oxygen resistance and creep resistance. The results are shown in Table 2.

As is clear from the results of Table 2, the Si/SiC-based sintered material of the present invention, as compared with a conventional product, has excellent oxidation resistance and creep resistance.

TABLE 1

| | Time length at 1,200–1,350° C. (hr) | Time length at 1,420–1,480° C. (hr) | Contents in (C powder + SiC powder + metal Si) | | | Weight ratio of materials C:SiC:Si |
| | | | SiO$_2$ content (wt. %) | Fe content (wt. %) | Ca content (wt. %) | |
| --- | --- | --- | --- | --- | --- | --- |
| Example 1 | 5 | 5 | 0.471 | 0.150 | 0.090 | 7.5:54.5:38 |
| Comparative Example 1 | 35 | 35 | 1.775 | 0.500 | 0.500 | 5:57:38 |

TABLE 2

| | Oxygen content (wt. %) | Fe content (wt. %) | Ca content (wt. %) | Oxidation resistance (Δwt. %) | Creep resistance (mm) |
| --- | --- | --- | --- | --- | --- |
| Example 1 | 0.19 | 0.152 | 0.033 | 0.24 | 0.48 |
| Comparative Example 1 | 0.59 | 0.250 | 0.220 | Cracks appeared | Ruptured in 76 hours |

[EXAMPLE 2: CORROSION RESISTANCE TEST 1]

As test samples, there were used the Si/SiC-based sintered material of the present invention and, for comparison, several kinds of commercial ceramics (mullite, SiC of SiO$_2$ bond, SiO$_2$-based brick, Si/SiC, etc.).

Each test sample was kept under the conditions shown in Table 3, in contact with each of various reactants of pellet form (10 mm in diameter and 20 mm in height) containing a high ionic-bond formability shown in Table 3. Thereafter, each test sample was examined for the depth of corrosion.

The results are shown in Table 3.

TABLE 3

| Pallets Reactant contained | Pb | Si | Sb | Ge | As | Se | In | Sn | Te | Tl |
|---|---|---|---|---|---|---|---|---|---|---|
| Amount used (g) | 10 | 3 | 5 | 3 | 5 | 3 | 5 | 5 | 5 | 5 |
| Conditions | 1,250° C. × 2hr | 1,250° C. × 2hr | 1,000° C. × 2hr | 1,000° C. × 2hr | 1,250° C. × 2hr | 1,350° C. × 2hr | 1,100° C. X 2hr | 1,400° C. × 2hr | 900° C. × 2hr | 800° C. × 2hr |
| Depth of corrosion* Example 1 (μm) | Very small (30) | Very small (500) | Very small (600) | Very small (40) | Very small (400) | Very small (900) | Very small (20) | Very small (60) | Very small (800) | Very small (20) |
| MX800 | Large | Large | Large | — | Medium | Large | Medium | Small | Medium | Small |
| MX200 | Medium | Medium | Medium | Large | Large | Medium | Small | Small | Medium | Medium |
| N100 | Medium | Small | Small | Small | Medium | Medium | Small | Small | Medium | Small |
| $Si_3N_4$ | Small | Small | — | — | Small | Small | — | — | Small | — |
| ISOLITE LBK30 | Large | Large | Large | Large | Large | Medium | Large | Medium | Large | Medium |
| OYK SK34 | Large | Medium | Large | Medium | Large | Large | Medium | Medium | Large | Medium |
| PSZ | Small | — | — | Small | Small | — | Small | Small | — | — |
| $Al_2O_3$ | Small | — | — | — | Small | Small | — | — | Medium | — |

*Depth of corrosion
Very small: 200~900 μm
—: Untested
Small: 1~10 mm
Medium: 10~30 mm
Large: 30 mm or more

[EXAMPLE 3: CORROSION RESISTANCE TEST 2]

The Si/SiC-based sintered material of the present invention was used as a lining material of roller hearth kiln in a $CaF_2$ atmosphere for 5 months, 12 months or 21 months, and measured for average corrosion amount, change of weight increase, change of bulk specific gravity, change of porosity and change of bending strength.

In this test, a sample of 30 mm×40 mm×5 mm (thickness) was kept at various temperatures between 773° C. and 1,190° C. and periodically taken out from the kiln for measurements.

The results are shown in FIGS. 4 to 7.

[EXAMPLE 4: CORROSION RESISTANCE TEST 3]

As test samples, there were used the Si/SiC-based sintered material of the present invention and, for comparison, several kinds of ceramics (Si/SiC, PSZ, $Si_3N_4$, alumina, etc.).

Each test sample was kept in an autoclave in the presence of hydrochloric acid or hydrofluoric acid (these two acids were used on the supposition that the reactant in kiln was chlorine or fluorine) and measured for average corrosion amount and reduction in strength.

The test using hydrochloric acid was conducted under two conditions, i.e. (1) a closed state, 36% HCl and 150° C.×200 hours and (2) a closed state, 20% HCl and 90° C.×1,000 hours. The test using HF was conducted under the conditions of a closed state, 10% HF and 90° C.×168 hours.

The results are shown in Table 4.

TABLE 4

| | TEST CONDITIONS | | | | | |
|---|---|---|---|---|---|---|
| | Reactant | | | | | |
| | 36% Hcl | | 20% Hcl | | 10% HF | |
| | Test conditions | | | | | |
| | Closed state, 150° C. × 200 hr | | Closed state, 90° C. × 1,000 hr | | Closed state, 90° C. × 168 hr | |
| Test item (Unit) | Corrosion amount (μm/24 hr) | Reduction in strength (%) | Corrosion amount (μm/24 hr) | Reducton in strength (%) | Corrosion amount (μm/24 hr) | Reducton in strength (%) |
| | TEST SAMPLE | | | | | |
| Example 1 | 0.03 | -13.7 | 0.0016 | 20.3 | 2.66 | 49.4 |
| PSZ | 65.67 | 6.8 | 0.0019 | 24.9 | Dissolved | Dissolved |
| $Al_2O_3$ | 2.14 | — | — | — | — | — |
| SSC | — | — | 0.0016 | -69.3 | — | — |

[Discussion on Results of Corrosion Resistance Test 1]

As is clear from the results of Table 3, the Si/SiC-based sintered material of the present invention, as compared with the conventional ceramic materials used, was corroded only slightly in high-temperature contact with an atmosphere containing an element of high ionic-bond formability (Pb, Bi, Sb, Ge, As, Se, In, Sn, Te or Tl) and was superior in corrosion resistance.

As is clear from the results of Table 3, most of the conventional ceramics used showed fairly high corrosion in high-temperature contact with a Pb-containing atmosphere. Even N 100 (a product of NGK Insulators, Ltd.), which has relatively high corrosion resistance, produced surface dent owing to the reaction with the Pb-containing atmosphere and had, on the whole surface, a Pb compound sticking to the surface.

In contrast, the Si/SiC-based sintered material of the present invention was hardly corroded and a trace of Pb flow on the surface was observed. Thus, the present sintered material showed excellent corrosion resistance in high-temperature contact with a Pb-containing atmosphere.

As is further clear from the results of Table 3, most of the conventional ceramics used showed fairly high corrosion in high-temperature contact with a Bi-containing atmosphere and generated gaps at grain boundaries, indicating the progress of reaction even into ceramic inside. Even N 100 (a product of NGK Insulators, Ltd.), which has relatively high corrosion resistance, had, on the whole surface, a Bi compound sticking to the surface.

In contrast, the Si/SiC-based sintered material of the present invention was hardly corroded and a trace of Bi flow on the surface was observed. Thus, the present sintered material showed excellent corrosion resistance in high-temperature contact with a Bi-containing atmosphere.

As is furthermore clear from the results of Table 3, the Si/SiC-based sintered material of the present invention had excellent corrosion resistance in high-temperature contact with atmospheres each containing an element of high ionic-bond formability other than Pb and Bi, i.e. Sb, Ge, As, Se, In, Sn, Te or Tl.

[Discussion on Results of Corrosion Resistance Test 3]

In the high-temperature contact with a $CaF_2$ atmosphere, the Si/SiC-based sintered material of the present invention showed no reduction in strength even after one-year use. Explanation is made on this.

Referring to FIGS. 4 to 7, discussion is made on the results when the present Si/SiC-based sintered material was used as a lining material of roller hearth kiln for 5 months, 12 months or 21 months.

Although the test sample used was not completely uniform and had some quality variations caused from productional reasons, the followings can be concluded.

(1) Each of the weight increase, bulk specific gravity, porosity and strength of the present sintered material showed no big difference when the test period was extended from 5 months to 12 months and further to 21 months, and was affected more by the temperature at which the sintered material was used.
(2) The following matters are seen between about 800° C. and about 1,100° C. (both are temperatures at which the sintered material was used).

|  | About 800° C. | About 1,100° C. |
|---|---|---|
| Weight increase | Large | Small |
| Bulk specific gravity | No change | No change |
| Porosity | Large | Small |
| Bending strength | Small | Large |

That is, the sintered material showed no major property change at about 1,100° C. However, at about 800° C., the sintered material generated pores; the atmospheric gas penetrated into the pores; corrosion took place slightly viewed from the slight reduction in bending strength although there was no change in bulk specific gravity.

Thus, the present sintered material showed different resistances to corrosion depending upon the temperature at which the sintered material was used; however, the present sintered material could retain a strength of 20 kgf/cm$^2$ after 12 months of use, even at about 800° C. where the sintered material showed the highest deterioration.

[Discussion on Results of Corrosion Resistance Test 3]

As is clear from the results of Table 4, the present Si/SiC-based sintered material, as compared with the conventional ceramics used, showed high corrosion resistance when kept in an autoclave in the presence of hydrochloric acid.

As to the present sintered material, the reduction in strength was seen when the test was made in an open state, as compared with when the test was made in a closed state, although it could not be seen in observation by SEM.

When kept in an autoclave in the presence of hydrofluoric acid, a conventional ceramic (PSZ) dissolved while the present Si/SiC-based sintered material showed corrosion of Si component alone by hydrofluoric acid.

The test samples used in the above tests were as follows as to the compositions and the preparation methods.
(1) The Si/SiC-based sintered material of the present invention was prepared in Example 1.
(2) MX 800 had a composition consisting of 28% by weight of $SiO_2$, 71% by weight of $Al_2O_3$ and 1% by weight of other components (e.g. Ca and F).
(3) MX 200 had a composition consisting of 22% by weight of SiC, 17% by weight of $SiO_2$ and 60% by weight of $Al_2O_3$ and 1% by weight of other components (e.g. Ca and F).
(4) N 100 had a composition consisting of 90% by weight of SiC, 7% by weight of $SiO_2$, 2% by weight of $Al_2O_3$ and 1% by weight of other components (e.g. Ca, V and F).
(5) $Si_3N_4$ was prepared by adding 5% by weight of MgO to α-$Si_3N_4$ having an average particle diameter of 3 μm, thoroughly mixing them, press-molding the mixture into a plate of 60 mm×60 mm×5 mm (thickness) at a pressure of 500 kgf/cm$^2$, and firing the plate at 1,700° C. for 2 hours in an $N_2$ atmosphere.
(6) ISOLITE LBK30 is a $SiO_2$-based light brick having a specific gravity of 0.88 g/cc.
(7) OYK SK34 is a $SiO_2$-based brick having a specific gravity of 2.19 g/cc.
(8) PSZ was prepared by press-molding a $ZrO_2$ powder (average particle diameter: 2 μm) containing 3 mole % of $Y_2O_3$, into a plate of 70 mm×70 mm×6 mm (thickness) at a pressure of 500 kgf/cm$^2$ and firing the plate at 1,450° C. for 1 hour in air.
(9) $Al_2O_3$ was prepared by mixing $Al_2O_3$ (average particle diameter: 0.5 μm) with 1% by weight of MgO, press-molding the mixture into a plate of 70 mm×70 mm×6 mm (thickness) at a pressure of 500 kgf/cm², and firing the plate at 1,700° C. for 2 hours in air.

(10) SSC was prepared by mixing β-SiC (average particle diameter: 0.5 μm) with 0.5% by weight of $B_4C$, press-molding the mixture into a plate of 70 mm×70 mm×6 mm (thickness) at a pressure of 500 kgf/cm², and subjecting the plate to temperature elevation to 1,800° C. in an argon atmosphere of 1 atm. and to 2,250° C. in vacuum, followed by keeping the temperature in vacuum for 2 hours to conduct firing.

As described above, the present invention provides a Si/SiC-based sintered material which is corrosion-resistant in a high-temperature environment containing, as a corrosion source, an element(s) of high ionic-bond formability, particularly Pb, Bi, Sb, Cl or/and F and therefore can withstand long-term use; a kiln furniture and a kiln lining material both made of the sintered material; and a kiln using the furniture and the lining material.

Therefore, the sintered material of the present invention can be suitably used as a lining material for kiln, which can withstand severe environments employed in production of various materials used in various applications and which is highly reliable.

What is claimed is:

1. A Si/SiC-based sintered material comprising Si and SiC as constituents, said sintered material having a $SiO_2$ content of 0.5% by weight or less and an oxygen content of 0.25% by weight or less, and the Si/SiC-based sintered material being corrosion-resistant in a temperature range of 800°–1,400° C. and an atmosphere containing at least one element selected from the group consisting of Ge, As, Se, In, Sn, Sb, Te, Tl, Pb, Bi, Cl and F.

2. A Si/SiC-based sintered material according to claim 1, wherein said at least one element has a melting point of 650° C. or less and a boiling point of 1,500°–1,750° C.

3. A kiln furniture made of a Si/SiC-based sintered material comprising Si and SiC as constituents, said sintered material having a $SiO_2$ content of 0.5% by weight or less and an oxygen content of 0.25% by weight or less, the Si/SiC-based sintered material being corrosion-resistant in a temperature range of 800°–1,400° C. and an atmosphere containing at least one element selected from the group consisting of Ge, As, Se, In, Sn, Sb, Te, Tl, Pb, Bi, Cl and F.

4. A kiln lining material made of a Si/SiC-based sintered material comprising Si and SiC as constituents, said sintered material having a $SiO_2$ content of 0.5% by weight or less and an oxygen content of 0.25% by weight or less, the Si/SiC-based sintered material being corrosion-resistant in a temperature range of 800°–1,400° C. and an atmosphere containing at least one element selected from the group consisting of Ge, As, Se, In, Sn, Sb, Te, Tl, Pb, Bi, Cl and F.

5. A continuous kiln comprising a region which is heated to 800°–1,400° C., the region being covered with a lining material made of a Si/SiC-based sintered material comprising Si and SiC as constituents, said sintered material having a $SiO_2$ content of 0.5% by weight or less and an oxygen content of 0.25% be weight or less, the Si/SiC-based sintered material being corrosion-resistant in a temperature range of 800°–1,400° C. and an atmosphere containing an element having a high ionic-bond formability at least one element selected from the group consisting of Ge, As, Se, In, Sn, Sb, Te, Tl, Pb, Bi, Cl and F.

* * * * *